(12) United States Patent
Cage, III

(10) Patent No.: US 6,315,244 B1
(45) Date of Patent: Nov. 13, 2001

(54) PASSIVE-RESTRAINT PRONE COCKPIT

(76) Inventor: Julius Theodore Cage, III, 2500 Carmel Rd., Birmingham, AL (US) 35235

(*) Notice: Subject to any disclaimer, the term of this patent is extended or adjusted under 35 U.S.C. 154(b) by 0 days.

(21) Appl. No.: 09/520,512

(22) Filed: Mar. 8, 2000

(51) Int. Cl.[7] .................................................. B64D 11/00
(52) U.S. Cl. ........................................................ 244/118.5
(58) Field of Search ............................. 244/118.5, 118.6, 244/122

(56) References Cited

U.S. PATENT DOCUMENTS 1,324,961 * 12/1919 Grantham ............................. 144/331

FOREIGN PATENT DOCUMENTS

WO-83/00128-A1 * 1/1983 (WO) ............................. B63H/11/08
WO-86/07329-A1 * 12/1986 (WO) ............................. B64C/31/02

OTHER PUBLICATIONS

Editorial Staff "Unconventional Flight" WINGS Magazine, Feb. 2000 pp. 34 & 46, A Sentry Publication.
Editorial Staff "Berlin B9 Experimental Aircraft" LuftFahrt International Magazine, Nov.–Dec. 1975 All.
Nat'l Park Svc. "Wright Brothers of Dayton" Online Magazine @www.nps.gov/wrbr/wright.htm All.
Stephan Wilkinson "Going Vertical" Smithsonian Inst. Air & Space Magazine, Oct./Nov. 1996 p. 4.

* cited by examiner

Primary Examiner—Charles T. Jordan
Assistant Examiner—G. L. Steele

(57) ABSTRACT

This invention features a prone pilot's couch conformable to the front of the pilot's body, relieving his arms of the need to support the body; twist- and pull-handgrips placed to the sides of the pilot's body for convenient control-surface actuation; a helmet brace for positive-g flight maneuvers; passive shoulder braces which confine the chest to the pilot's couch in all flight attitudes, when forward exertion is applied by the legs; and channels conforming to three sides of the pilot's legs, having a lip or shelf which protrudes outward from a bracing area between the pilot's legs, for support during inverted flight maneuvers, forward exertion being applied by the legs.

2 Claims, 2 Drawing Sheets

PASSIVE-RESTRAINT PRONE COCKPIT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to seats peculiar to aircraft and devices for holding the occupant to their seat.

The earliest aircraft to feature a prone-pilot cockpit was the Wright Flyer of 1903, incorporating a flat, fabric-padded board with no provision for lateral security or head support, and a simple foot rest. There was no provision for a shoulder brace on this aircraft, nor were securing straps used; gravity alone held the pilot within the aircraft. At this time the prone cockpit was not improved upon, and subsequent aircraft (i.e., the Wright Model B of 1911) immediately adopted the familiar seated cockpit.

The next aircraft to feature a prone cockpit was the Berlin B9 Experimental Aircraft of 1943. The best available resource on this aircraft says that the pilot's legs were used for rudder control input in the standard fashion (i.e., a pivoting bar hinged in the middle). This arrangement is disadvantageous because the legs cannot be locked in place to rigidly support the body, nor can they exert forward effort to secure the shoulders against a shoulder brace. Moreover, in this rudder configuration there was no part of the aircraft's body between the pilot's legs to add an additional bracing area. The B9 had a locking strap harness to secure the pilot to the aircraft; unfortunately, in a prone position, such an apparatus can be fatally inconvenient to quickly disengage in the event of a loss of control or other emergency. While this aircraft featured a vertical shoulder brace, forward exertion by the legs was not possible inasmuch as a certain range of motion (200 mm) was required to operate the rudder. This vertical brace did not curve back over the pilot's shoulders to provide support during inverted flight. A padded chin-rest was also conceived of, tested, and rejected, the final B9 design having no support at all for the pilot's head.

The control input effort for previous prone-piloted aircraft has shown to be very high, because the pilot has less room for movement of controls and levers; a stick or wheel must be correspondingly shorter, with a higher gearing, to achieve comparable control-surface throw. Too, the prone pilot's leverage for performing control input is less if his body is not rigidly braced. All traditional aircraft use direct manual effort to accomplish maneuver, and all previous prone cockpit arrangements featured flight controls placed below the pilot's body, not to the sides.

Another aircraft which featured a prone cockpit arrangement for substantially forward flight was the Henschel Hs132, a German development aircraft which never flew; one single photograph survives. The control arrangement in this aircraft was the same as in the Berlin B9, it's design predecessor, employing a foot-controlled rudder and vertical shoulder braces which did not extend backwards over the pilot's shoulders. This was to be a jet-powered aircraft, and it is expected that the designers would have found insufficient support and securing of the pilot's body in high-g maneuvers. The test-flight facility evaluating the Hs132 was overrun by Russian forces in 1944, and the aircraft was lost.

The last known aircraft to feature a prone cockpit was the WeeBee, invented by Ken Coward and William Chana in 1948. No patent is known for this miniature, all-metal airplane upon which the pilot lay in a faceforward position. The WeeBee's prone cockpit incorporated a chin-pad to support the head and a simple notch into which the feet were inserted, and shoulder braces were not provided. The WeeBee also featured straps to secure the pilot to the aircraft, which are difficult to latch and unlatch while laying prone. One feature of the WeeBee which was singularly disadvantageous was the chin-pad, through which impact forces upon landing could be transferred to the pilot's chin; another was that the simple foot-notch and strap arrangement put the pilot in danger of unintentionally departing the aircraft in flight.

No provision for securing the legs in a prone-piloted aircraft has ever been found, except for in thrusting against a simple bar or brace. All other securing devices in previous prone-piloted aircraft consisted of securing straps and simple straight shoulder braces. Despite aerodynamic and physiological advantages, the prone-cockpit arrangement has never been adequately improved. The control sectors in previous prone-piloted aircraft have uniformly been below the pilot, blocking downward vision, necessitating a certain distance from the bottom of the fuselage, thus requiring a taller fuselage with higher wind resistance. Provision for controls to the side of the pilot will give a flatter profile and thus yield less wind resistance, while also positioning the pilot's face closer to the bottom of the fuselage where a window will be employed for vision through the bottom of the aircraft.

Since the days when the prone-cockpit concept was last explored several improvements in the field have been made, most notably fly-by-wire controls (whereas very little control input effort is required) and the blended wing-body fuselage (whereas a gradually thickening area forms the joint between the wing and the fuselage of an aircraft).

BRIEF SUMMARY OF THE INVENTION

The object of the present invention is to provide an improved prone-piloted cockpit, employing passive safety features sufficient for pilot security and restraint within the full range of aerobatic maneuver, and to allow instant emergency release at will therefrom. In this embodiment a canopy is not used above the pilot in an aircraft utilizing the Improved Passive-Restraint Prone Cockpit, allowing instant egress from the aircraft in an emergency, or optional descent at will by way of parachute. This is a clear improvement over previous prone-pilot cockpit configurations.

This invention features molded cavities supporting the pilot's legs on three sides, allowing both support in all axes of movement (when the legs are flexed forward and together) and instant release (when the legs are relaxed). In addition, when the pilot's legs push forward in the "locked" position, his shoulders are forced forward into appropriately-shaped and padded braces which extend backwards over his shoulders, yielding positive support and restraint in the pitch, roll, and yaw axes. A brace for the pilot's helmet is provided for support when looking downward, and the Cockpit is designed so that the pilot may also look over the front of the aircraft by bending his head back. The helmet brace contacts the pilot's helmet above or below the helmet's visor, or in combination. In the inverted flight regime, the pilot is held to the aircraft by virtue of the bracing area along the backs of his legs and feet, and by the shoulder braces which curve back over the backs of his shoulders, and by his grasp upon the hand-grip controls. Even with the weight of the pilot partially dependent upon his grasp of the hand-grip controls, sufficient ability will be retained to twist and pull the hand controls to attain the desired attitude; this by virtue of low-effort, constant-rate electronic fly-by-wire flight controls. All required control-surface input can be generated by way of these twist- and pull-handgrips.

The invention is operated in the flight mode when the pilot lays upon the pilot's couch and fits his shoulders into the shoulder braces. Next, his legs are fitted into the molded-in channels and clenched together until they are stopped and braced by the between-leg "squeeze" area. The pilot then rests his helmet upon the helmet rest and grasps the motorcycle-type flight controls.

The invention is operated in the escape mode when the pilot releases the flight controls and moves his legs sideways from out of the molded-in channels. The pilot then places his hands on the fiberglass shell at a convenient place and pushes himself out of the shoulder braces, backwards and upwards, to clear the aircraft.

DETAILED DESCRIPTION OF THE INVENTION

Figure 1:
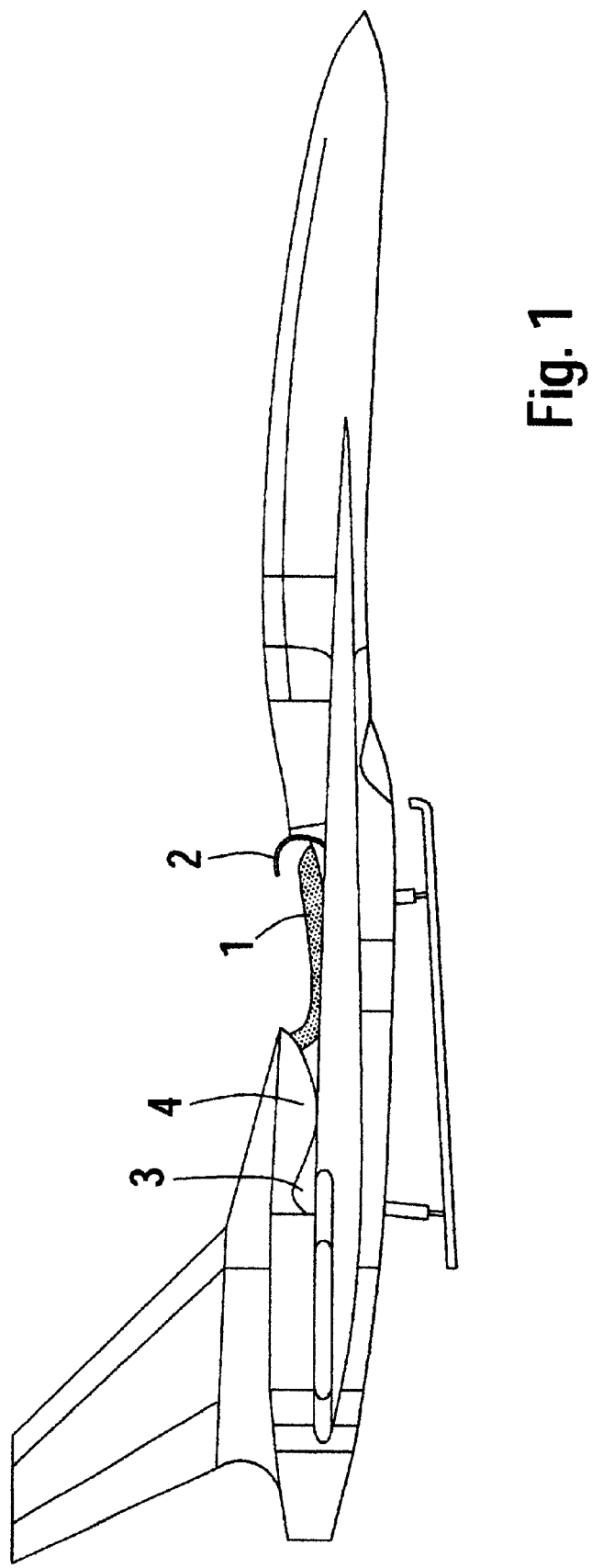
FIG. 1 is a side view of a proposed light aircraft incorporating the invention.
Figure 2:
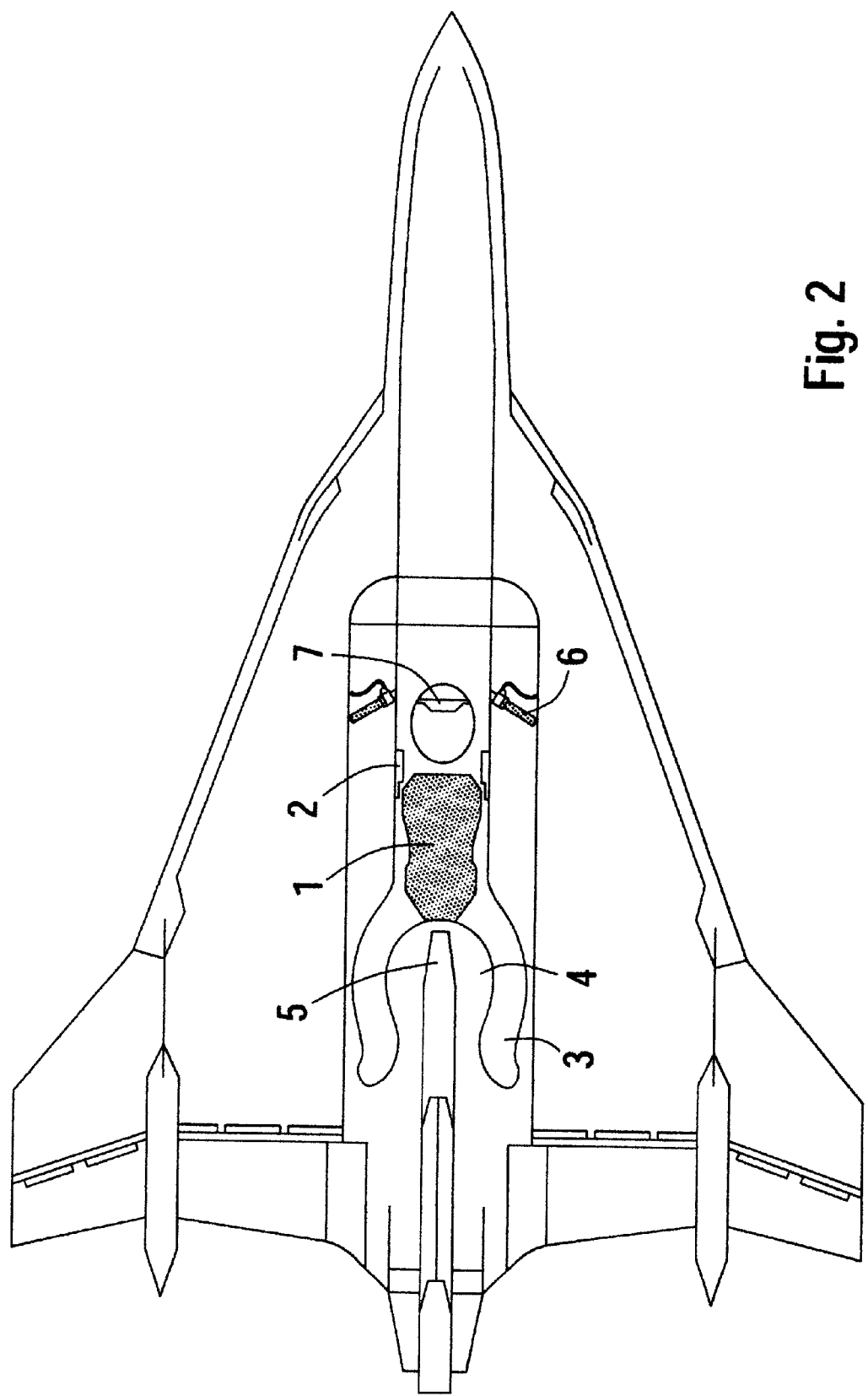
FIG. 2 is a top view of a proposed light aircraft incorporating the invention.

The invention is incorporated in a proposed light aircraft, in which the fuselage is comprised of a mild steel tubing interior frame, and an exterior shell made of fiberglass or a comparable material.

The shell is molded to conform to median dimensions for a pilot of six feet in height, with channels running along the sides of the fuselage closely conforming to three sides of the leg (the inside, the front, and up to seventy-five percent of the back of the leg). The channel cavity is so molded as to provide a lip or shelf to protrude over the backs of the pilot's legs. In normal upright flight, this channel is formed so as to support the pilot's legs from the pilot's waist to the soles of his feet. In inverted flight the channel supports an area of up to seventy-five percent of the width of the backs of the pilot's legs and feet from his crotch area to the soles of his feet.

Upon the shell is attached a padded fabric pilot's couch ergonomically inclined so as to support the front of the pilot's body from his waist to his shoulders.

Forward of the pilot's shoulders is provided a pair of curved and and padded shoulder braces which are adjustable for pilot height, suitably attached to the steel tube frame and emerging from the fiberglass shell. The brace is made of high-impact plastic or a comparable material, and the padding is made so as to compress a distance on the order of ten centimeters. This brace is made to curve over the backs of the pilot's shoulders a distance of up to twenty centimeters, and to wedge the pilot's shoulders more tightly as he straightens his legs.

To the sides of the pilot, motorcycle-type handgrip controls are attached to the steel tube frame and emerge through the fiberglass shell. These controls comprise pitch, roll, and yaw input devices.

A passive helmet brace is provided, attached to either side of the fiberglass shell, comprising a high-strength plastic member which fits the curve of the pilot's helmet either above or below the helmet's visor, or both.

I claim:

1. A pronely-piloted aircraft cockpit arrangement comprising;

a leg brace substantially conforming to a pilot's leg on two sides, wherein said leg brace also conforms to at most seventy-five percent of said pilot's leg on a third side, and a shoulder brace substantially conforming to said pilot's shoulder from the top of said pilot's shoulder to a distance of twenty centimeters down the back of said pilot's shoulder, wherein said shoulder brace is shaped with a diminishing clearance so as to retain said pilot's shoulder more tightly as forward force is exerted by said pilot, and flight-control placement lateral to said pilot's body, said flight controls consisting of contstant-rate electronic mechanisms, and a helmet brace positioned to securely restrain and support said pilot's helmet by means of a conformable surface, which contacts the front of said pilot's helmet either above or below said helmet's visor, or in combination.

2. A pronely-piloted aircraft cockpit arrangement according to claim 1 wherein said pilot's center of gravity is forward of the center of pressure of any rigid wing system used with said arrangement.

* * * * *